United States Patent

[11] 3,603,590

[72] Inventor  Ulf Carl Iwar Sellman
             Roslags-Nasby, Sweden
[21] Appl. No. 731,895
[22] Filed     May 24, 1968
[45] Patented  Sept. 7, 1971
[73] Assignee  A B Flygmal Air Target Ltd.
             Stockholm, Sweden

[54] APPARATUS FOR RECORDING HIT RESULTS ACTIVATED BY SHOCK WAVES ENERGIZING HIT DETECTORS
5 Claims, 3 Drawing Figs.

[52] U.S. Cl. .................................................. 273/102.2 B, 340/16 M
[51] Int. Cl. .................................................. F41j 5/04
[50] Field of Search .......................... 273/102.2 B; 340/16 M; 346/76

[56] References Cited
UNITED STATES PATENTS

| | | | |
|---|---|---|---|
| 3,441,948 | 4/1969 | Ondis | 346/76 |
| 2,448,587 | 9/1948 | Green | 273/102.2 B X |
| 2,783,047 | 2/1957 | Faxen | 273/102.2 B |
| 2,925,582 | 2/1960 | Mattei et al. | 273/102.2 B X |
| 2,955,778 | 10/1960 | Beveridge | 273/102.2 B |
| 3,160,415 | 12/1964 | Knapp | 273/102.2 B |
| 3,217,290 | 11/1965 | Sellman | 340/16 M UX |
| 3,252,705 | 5/1966 | Cornberg | 273/102.2 B X |

FOREIGN PATENTS

| | | | |
|---|---|---|---|
| 902,756 | 8/1962 | Great Britain | 340/16 M |
| 222,834 | 11/1942 | Switzerland | 340/16 M |

OTHER REFERENCES

Acoustic Miss Distance Indicator Lythe-22 August/1962 (see 1st Drawing)

Primary Examiner—Richard C. Pinkham
Assistant Examiner—Marvin Siskind
Attorney—Sommers & Young ABSTRACT: A system for registering the miss distance of projectiles shot at a target. The system includes a means which generates a signal response to each projectile, which signal has an amplitude responsive to the amplitude of the acoustic wave produced at the target by the projectile. The generated signal selectively energizes a plurality of zone-marking units, each of which is responsive to a different amplitude of the generated signal, which amplitude corresponds to a predetermined miss distance from the target. A recording means is operated for each projectile which caUses the generation of the signal in accordance with the response of the zone-marking units to thereby indicate for each projectile its miss distance from the target.

PATENTED SEP 7 1971 3,603,590
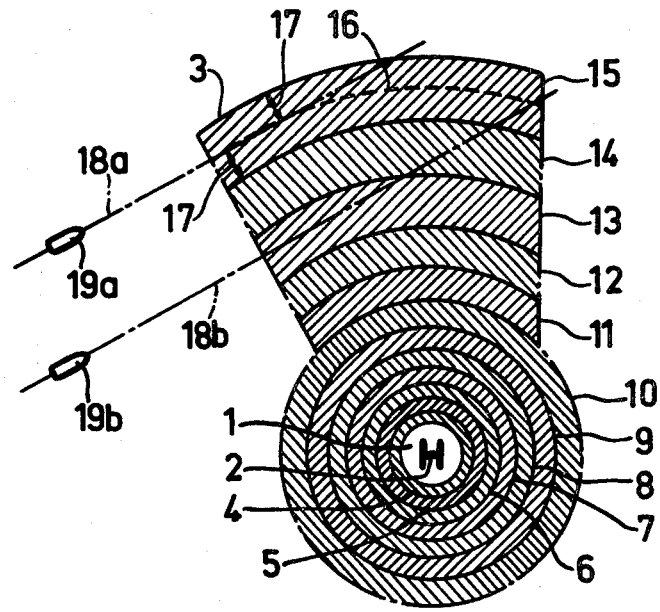
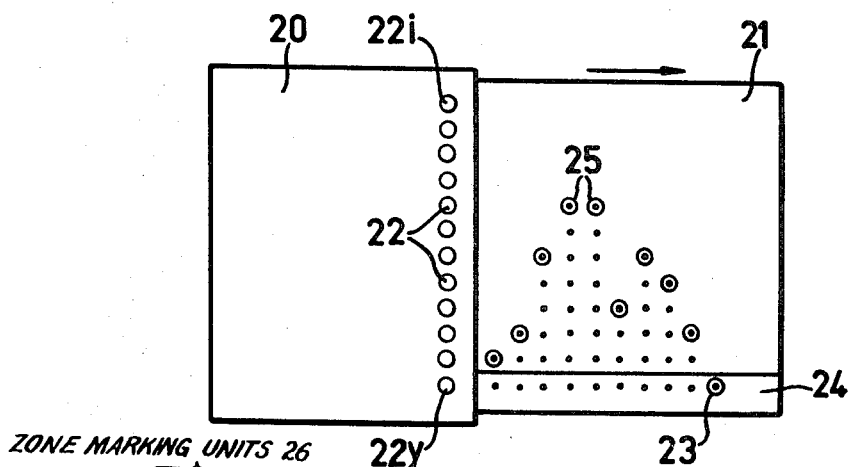
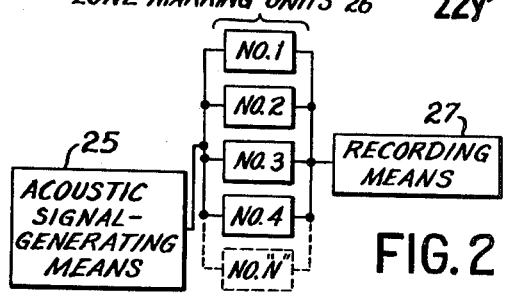
Inventor
Ulf Carl Ivar Sillman
By Sommers & Young
Att'ys

APPARATUS FOR RECORDING HIT RESULTS ACTIVATED BY SHOCK WAVES ENERGIZING HIT DETECTORS

When firing at targets having acoustically operated hit indicators for recording the miss distances, the hit i.e., shot, results are obtained, when using the hitherto-known indicators, either as "yes"/"no" information indicative of whether or not a projectile has passed within or beyond a given range limit (zone border) surrounding the indicator, or as a measurement number showing the distance at which the projectile has passed the indicator. The "yes-no" information is usually expressed by forwarding a counter one step for each "yes" information, i.e. for a passage within a zone border. A direct indication of the miss distance in terms of a measurement number may be presented, for example, as a code number in an electronic digital counter, and said code number may then be evaluated by referring to calibration tables or calibration curves, or as a direct range indication in meters, for example, in a digital counter or the like.

The "yes-no" method of information—hereafter called "zone marking"—is usually used in connection with two or three fixed and arbitrarily selected zone borders, and is applicable to firing rounds, i.e. repeated sequences of individual shots. A direct indication of miss distances by means of a presented measurement number is only used in connection with "single-shooting," i.e. when the firing is performed at such a slow rate that it allows a reading of, and possibly a written record of, the measurement number before the occurrence of the next shot. The last-mentioned method provides the most accurate information regarding the hit results. However, with regard to the fact that the hitherto-known hit indicators, due to the presence of external uncontrollable factors, at best provide a minimum uncertainty in the measuring of ±10 percent, the precise range indication (in meters) derived from the measuring signals produced by the indicator will in many cases obviously be very deceiving.

It would, of course, be most desirable, when shooting at high firing rates, which is widely performed with modern weapons for education and training purposes, to obtain an exactness of information for each shot, that is comparable with a single-shot firing, with a presentation of a measurement number but without misleadingly precise values. Further, it would desirable to have this hit information, especially firing rounds (rapid shot sequences), automatically recorded on a medium, for example a paper tape or sheet, in such a way that the hit results will be presented in a conveniently surveyable manner but still enabling a detailed evaluation. Further, it is desirable to obtain information about the chronological occurrence of the individual results of the shots fired in a round. It is also, of course, important that the recording apparatus in itself be of a simple and economical, as well as a reliable structure.

The present invention, the purpose of which is to realize the requirements stated above, refers to an arrangement for recording the miss distance of each individual shot in a firing round, principally independent of the firing speed and the number of shots in each round. The invention is based on the new concept that the measuring region surrounding an acoustic-type hit indicator—which region e.g. may be limited by an outer range border of 20 meters and an inner minimum border of about 2 meters——is divided into a number of fixed zones, chosen in such a way that the outer tolerance limit of every measuring zone approximately coincides with the inner tolerance limit of the adjacent outer zone, the tolerances of the zones being determined by the measuring exactness of the hit indicator device. For a measuring error of about 10 percent and an assumed measuring region between 2 and 20 meters from a hit indicator, a full covering of 12 zones will result according to the new concept. These zones will constitute a "gauge scale," the exactness of reading of which corresponds to the exactness of the measuring device.

In accordance with the above, the invention refers to a method of registering hit results when shooting at targets equipped with a hit indicator, the measuring region of which comprises fixed measuring zones, the improvement being that the number of measuring zones and their positional relationships are chosen such that every measuring zone, the width of which is chosen to be substantially equal to the sum of the absolute values of the plus and minus tolerances of the indicator, obtained by measurings performed on a projectile at the nominal range of each measuring zone, has its outer border substantially coinciding with—and preferably slightly overlapping—the inner border of the adjacent outer measuring zone, whereby the total measuring region is covered, and a substantially correct concept of the passage of a projectile through the measuring region is obtained, and thus the miss distance may be derived from zone signals which, in a manner known per se, are electrically recorded at least at the passing in of the projectile into the various measuring zones.

The just-described inventive concept of the invention may be described in any equivalent way as follows: The system includes a signal-generating means which generates a signal for each compressional wave at the target resulting from a projectile fired at the target, and the maximum amplitude of the generated signal is related to the distance of closest approach of the projectile to the target. The system further uses a plurality of zone-marking units, each associated with a different nominal miss distance from the target and each being rendered active for a predetermined magnitude of the generated signal (which may be considered as the threshold value of the generated signal) and being of course rendered active for all amplitudes of the generated signal greater than the predetermined magnitude for that particular zone-marking unit.

The predetermined magnitude of generated signal to which any of the several zone-marking units becomes responsive is a function of the predetermined plus and minus tolerances which are inherent in any miss indicator system. Thus, when a plurality of projectiles is fired at the target and with all having the same miss distance, it is found that the amplitude of the generated signals has a particular mean value for the plurality of successive rounds, but that the amplitude of signal for any one particular round may be above or below the mean value with, however, substantially all such signals lying within a predetermined zone to either side of the mean value which then establishes a predetermined plus and minus tolerance. In one specific embodiment, the tolerance was determined to be plus and minus 10 percent of the mean value.

Once the predetermined plus and minus tolerances have been determined, the zone-marking unit for the outermost zone is arranged to become responsive to a predetermined magnitude of the generated signal which is less than the mean value of signal for the particular miss zone associated with that zone-marking unit by the amount of the minus tolerance. Consequently, all generated signals having a greater amplitude than this will result in operation of that particular zone-marking unit. This, however, does not establish the inner boundary for that zone-marking unit. The inner boundary is established by the outer boundary for the zone-marking unit associated with the next inner zone. This is accomplished by setting the predetermined magnitude of response for such next zone-marking unit so that its predetermined magnitude (which is less than the mean value of the signals generated for the nominal miss distance for that unit by the amount of its predetermined miss tolerance) is at, or slightly less, in value than the mean value of the signals for the next outer zone, plus the predetermined plus tolerance associated with that next zone.

Since it can be determined experimentally that the plus and minus tolerances are a predetermined percentage of the miss distance, thereby increasing in absolute value for successively outer zones, it follows that the radial spacing of successive zones corresponds to the miss distance. It further follows that, once the outer miss zone is selected, and the predetermined plus and minus tolerances are known, that the spacing of the successive zones is predetermined as is also the number of the successive zones extending inwardly toward the target.

An embodiment of the invention will be described below with reference to the accompanying drawings.

FIG. 1 is a diagram showing the division of the measuring region in accordance with the invention;

FIG. 2 is a block diagram showing the organization of the hit indicator of the invention; and FIG. 3 is a schematic representation of an arrangement for recording the information coming in from the measuring region.

From FIG. 1 it is seen how the zones are distributed according to the invention when using a hit indicator. The measuring exactness is assumed to vary ±10 percent around the theoretically exact value and the whole measuring region has a spherical extension with an inner measuring area border 1 at a distance of 2 meters from the hit indicator 2, and an outer range border 3 at a distance of 20 meters from the indicator. The 12 annular areas 4–15, marked by hatching, are the measuring zones. It should be understood that the designated zones in FIG. 1 are representative of the acoustically designed hit zones and do not represent physical apparatus. The respective nominal distances (i.e. the theoretically exact distances) of the zones from the indicator 2 are represented by broken-line circles 16 in each zone (though only shown for zone 15). The radial distance 17 (only shown for zone 15) from the nominal distance circle of any zone to the inner and outer, respectively, borderline is, thus 10 percent of the nominal distance of that zone. In FIG. 1, it is assumed that the borders of the different zones coincide. Due to the distribution principle used, the width of the zones will gradually increase with the distance from the center, i.e. the hit indicator 2, as is obvious from the figure. The lines 18a and 18b are assumed to represent the paths of a first and a second fired projectile 19a and 19b, respectively. In practice it is often advantageous to make the zones slightly overlap each other or be slightly separated from each other, in order to obtain nominal zone distances defined by integral numbers.

FIG. 2 shows in block diagram form the general organization of the system of this invention. The acoustic signal-generating means 25 includes a transducer at the target which produces a signal for each projectile passing in the vicinity of the target, and the amplitude of such signal is a function of the closest distance reached between projectile and target during the projectile's trajectory. The resulting signal may be applied to a plurality of zone-marking units 26, one of which is provided for each concentric zone radially spaced about the target. Each of these zone-marking units is rendered active in response to a respectively different level of the generated signal so that the response of the plurality of these units is a function of the miss distance of the projectile from the target. The various zone-marking units are all operatively coupled to a recording means 27 which then records, for each projectile, its miss distance from the target.

FIG. 3 shows a schematic recording apparatus 20 of a writing type, which produces on a recording paper sheet 21 a marking point for each measuring zone which is hit or penetrated by a projectile. The marking is assumed to take place only at the passing in of a projectile into a measuring zone. Every zone is represented in the recording device by a marking unit 22, e.g. a point-shaped light source, which momentarily is illuminated so as to produce a dark spot on the (light-responsive) paper sheet in the point towards which the light source is directed. The marking units are positioned in a row perpendicular to the longitudinal or moving direction of the record sheet and are arranged in the same consecutive order as that of the measuring zones. Thus, the innermost zone 4 is represented by the marking unit 22i, and the outermost zone 15 by the marking unit 24y. In the case of repeated firing at the hit indicator, i.e. a firing round, the record sheet is fed in the direction of the arrow at a rate that is adapted to the firing rate so that the marking points will appear clearly in the way shown in FIG. 3 and enable an evaluation of the number of hits in the different measuring zones. A shot round including a series of 10 shots may e.g. result in a hit recording on the paper sheet 21 in accordance with FIG. 3. Thus, the first shot of the round resulted in this case in a marking point 23 in that row 24 of the paper sheet which is marked through the marking unit 24y associated with the outermost measuring zone 15. This means that the first shot passed only into or through the outermost zone 15.

The second shot has, according to FIG. 3, been marked in the positioned corresponding to the three outermost zones 15, 14 and 13; this means a "hit" in zone 13. The remaining shots have, according to the recording shown in FIG. 3, resulted in hits in zones corresponding to the uppermost point in each column 25 of points, said point being identified by a small circle around the point.

By means of a record diagram of the type shown in FIG. 3 a highly surveyable representation of the hit results is obtained, where the hits in the different zones are marked in a chronological order. In this way it will be possible to judge how the shooter has aimed or how the weapon has been directed, respectively, during the firing round.

The complete arrangement of the invention operates as follows: A sequence of shots is fired at a target—which e.g. may be a towed airborne target—equipped with a hit indicator having the total measuring region divided into zones in accordance with the invention. A shot is assumed to pass through the three outermost zones (as was the case with the second shot in the example given above) e.g. along the projectile path 18b in FIG. 1. Then the indicator responds by producing a pulse of such characteristic (e.g. magnitude) that each of three marking units (light sources) of the recording apparatus, corresponding to the three outermost zones are pulsed once to produce an individual marking point on the recording paper. This paper is assumed to be fed at a certain rate, e.g. 20 mm. per second for a firing rate of e.g. four shots per second. The next shot is assumed to be a "full hit" and passes consequently into or through the innermost zone 4. In this case the indicator produces a new pulse of such a high magnitude that all zone-marking units of the recording apparatus are activated to produce corresponding marking points on the recording paper; this paper has at that time been displaced about 5 mm. with respect to the position of the paper when the first shot was recorded. Thus, the column of marking points produced by the second shot will be 5 mm. displaced laterally with respect to the column resulting from the first shot. As the projectiles pass through the measuring region of the hit indicator, there are produced on the recording paper laterally displaced columns of points where each column chronologically corresponds to its associated shot in the round, and the number of points in each of the columns will correspond to the number of zones penetrated by a different projectile. The zone corresponding to the highest point in a column is the innermost zone border that the associated projectile has penetrated and will thus be a measurement value of the miss distance of said projectile, i.e. the closest passing distance. The measurement value (i.e. the nominal zone border) will therefore be presented with the same exactness as that corresponding to the measuring exactness of the hit indicator.

The apparatus described above for marking hits in or penetration of the measuring zones, may, of course, be realized by use of marking units of a different type than the described light sources for marking points. Thus, a mark may be produced by e.g. a punched perforation, a jumping spark through the paper, a point pressure against an ink ribbon, or some other type of a fixed marking unit. Further, a multichannel writer could be used of the number of channels is at least equal to the number of measuring zones. However, it is important that the marking units are operating at a sufficiently high speed for recording each shot selectively even at the (for the present) highest firing rates, i.e. about 100 shots per second.

A marking of the zone hits may—if no documentation and information of the chronological order are strictly required—also be made by stepping adding counters, each of the measuring zones then being represented by a different counter. By this method information is obtained of the number of projectiles in a round that have passed into the different measuring zones, but no information is obtained regarding the order in which the passages of the projectiles have occurred.

Also other methods for marking of hits in measuring zones may be used if said zones are of the "memory type" and the zone hits in a round are summed up.

Beyond the solutions suggested above also other modifications may be applicable to the invention regarding the subdivision of the measuring region of a hit indicator into measuring zones, as well as the manner of recording the passage ("hit") of projectiles in said zones, without interfering with the principles of the invention.

What I claim is:

1. A system for registering miss distances when shooting at a target by indicating the miss zone of closest approach to said target from a plurality of concentric nominal miss zones centered on the target, said system comprising in combination, means for generating a signal in response to each projectile passing in the vicinity of the target which signal has an amplitude representative of the amplitude of the acoustic wave produced at the target by the projectile and proportional to the miss distance of such projectile from said target within a known plus and minus tolerance limit representing a predetermined percentage of the miss distance, a plurality of zone-marking units, at least one of said zone-marking units being energizeable by said generated signal, each said unit for any particular nominal miss zone being rendered active by said generated signal when its amplitude equals or exceeds a predetermined magnitude, said predetermined magnitude for each one of said units respectively associated with the successive miss zones being selected in such manner that each is substantially at the mean value of signals generated by projectiles passing said target at the nominal miss distance associated with said unit less the tolerance limit associated with said particular miss distance, said predetermined magnitude of signal for each respective zone-marking unit of a pair of said units for adjacent miss zones being so interrelated in value that said predetermined magnitude for one said unit is at least as low as the mean value of the signals generated by projectiles passing said target at a miss distance corresponding to the next outer miss zone plus the tolerance limit associated with said next outer zone, whereby each successive miss zone has a radial width substantially proportional to the radial distance of said zone from the target and predetermined by the magnitude of said tolerance limits so that said miss zones are in adjacent relationship and substantially cover the space from the innermost to the outermost of the successive miss zones, and means for recording for each projectile for which said signal is generated an output representative of the response of said zone-marking units to indicate thereby for each said projectile its miss distance from the target.

2. The combination of claim 1 wherein said recording means comprises, a marker means for each said zone-marking unit, a recording medium adapted to receive a manifestation thereon when any said marker means is rendered active in response to said generated signal, and means for moving said marker means and said recording medium relative to each other.

3. The combination of claim 2 wherein said marker means are disposed in a straight row and said moving means moves said recording means at right angles to the row of said marker means.

4. The combination of claim 2 wherein said recording means is moved a discrete distance for each projectile fired at said target.

5. The combination of claim 4 wherein said marker means comprises a light source and said recording medium comprises a light-responsive surface.